No. 864,596. PATENTED AUG. 27, 1907.
J. P. BAUMGARTNER.
HOOK AND EYE.
APPLICATION FILED SEPT. 30, 1905.
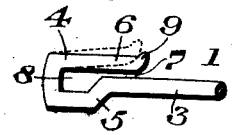
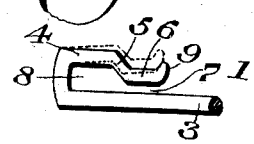
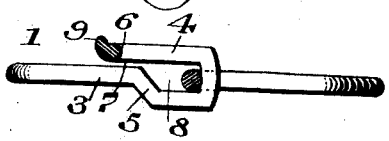
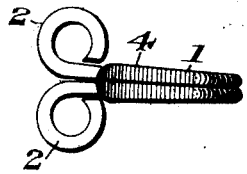
Witnesses
P. F. Nagle.
L. Donville.
Inventor
Joseph P. Baumgartner.
By Wiedersheim & Fairbanks.
Attorneys

UNITED STATES PATENT OFFICE.

JOSEPH P. BAUMGARTNER, OF PHILADELPHIA, PENNSYLVANIA, ASSIGNOR OF ONE-HALF TO WILLIAM I. FORBES, OF PHILADELPHIA, PENNSYLVANIA.

HOOK AND EYE.

No. 864,596.　　　　　Specification of Letters Patent.　　　Patented Aug. 27, 1907.

Application filed September 30, 1905. Serial No. 280,779.

*To all whom it may concern:*

Be it known that I, JOSEPH P. BAUMGARTNER, a citizen of the United States, residing in the city and county of Philadelphia, State of Pennsylvania, have invented a new and useful Hook and Eye, of which the following is a specification.

My invention consists of a new and useful hook having means for preventing the improper release of the eye, the back member and bill member forming a narrow inlet passage, the walls of which being adapted to frictionally engage the eye for a considerable distance in its passage therethrough, and said back and bill members being substantially parallel for this distance.

Figures 1 and 2 represent side elevations of portions of the hook showing slightly different forms. Fig. 3. represents a vertical sectional view through the center of the hook with the eye in position. Fig. 4 represents a plan view of the hook.

Similar numerals of reference indicate corresponding parts in the figures.

Referring to the drawings:—1 designates a hook having the usual loops 2 for securing the same in position, said hook consisting of a back member 3 and a bill member 4, one of said members having an offset 5 therein, which, in Fig. 1, is shown in the back member, and in Fig. 2, is shown in the bill member, the said bill and back members being parallel, in all of the forms shown, throughout a portion of their length, and as at 6, forming an inlet passage 7 between the members which is of such size as to prevent passage of the eye therethrough without frictional engagement with the walls thereof, the members forming in addition, the deep seated passage 8 for the reception of the eye after the same has passed the inlet passage 7.

The end of the bill member is flared as at 9 in order to properly direct the eye into the said inlet passage in its entrance to the deep seated passage 8.

It will be evident from the construction just described, that the accidental displacement of the eye from the hook is prevented both by reason of the offset and by reason of the narrow inlet passage 7, since the eye would first strike the off-set and if it were directed by any reason into the inlet passage owing to the length of the same caused by the parallel extension of the back and bill members it would be almost impossible for the eye to pass this passage unless it be so intended, it being understood that the extent of this passage is thus of advantage over the ordinary hump construction which might easily permit the eye to pass. It will be further apparent that in its passage between the parallel members, the eye causes the bill member to be raised for this purpose.

Where I refer to the least thickness of the eye where it is engaged by the hook, I intend, of course, to consider the operative thickness of the cross-piece or bar of the eye which is engaged by the hook and not to any short section of smaller thickness which might be used without in itself coming in contact with the hook, as the advantage of my hook proceeds from the frictional engagement of the parts in insertion and withdrawal.

Having thus described my invention, what I claim as new and desire to secure by Letters Patent, is—

1. In a device of the character described, an eye in combination with a hook whose inlet passage is extended and of narrower width than the least thickness of the eye where it is engaged by the hook.

2. In a device of the character described, a hook having an extended inlet passage of substantially uniform width in combination with an eye of substantially circular section where it engages with the hook and of greater diameter than the width of the passage.

JOSEPH P. BAUMGARTNER.

Witnesses:
JOHN A. WIEDERSHEIM,
C. D. McVAY.